United States Patent [19]
Hoekstra

[11] Patent Number: 5,659,373
[45] Date of Patent: *Aug. 19, 1997

[54] APPARATUSES INTERCONNECTED FOR THE COMMUNICATION OF CONTROL MESSAGES

[75] Inventor: Jelle Hoekstra, Dorking, England

[73] Assignee: D2B Systems Company Limited, Redhill, England

[*] Notice: The term of this patent shall not extend beyond the expiration date of Pat. No. 5,479,385.

[21] Appl. No.: 488,321

[22] Filed: Jun. 7, 1995

Related U.S. Application Data

[62] Division of Ser. No. 102,013, Aug. 4, 1993, Pat. No. 5,479,385.

[30] Foreign Application Priority Data

Aug. 6, 1992 [GB] United Kingdom ............... 9216681

[51] Int. Cl.$^6$ ............................................... H04N 5/44
[52] U.S. Cl. ............... 348/734; 348/552; 340/825.04; 340/825.22; 341/22
[58] Field of Search ............... 348/474, 734, 348/706, 552, 725, 732; 455/6.3, 4.1; 340/825.22, 825.03, 825.04, 825.11, 825.12; 341/26, 22, 23; H04N 5/44

[56] References Cited

U.S. PATENT DOCUMENTS

| | | | |
|---|---|---|---|
| Re. 34,895 | 4/1995 | Morotomi et al. ............... | 348/734 |
| 4,270,145 | 5/1981 | Farina ............................... | 348/734 |
| 4,846,597 | 7/1989 | Bryant et al. ..................... | 341/23 |
| 5,132,679 | 7/1992 | Kubo et al. ....................... | 340/825.22 |
| 5,136,694 | 8/1992 | Belt et al. ......................... | 341/22 |
| 5,187,469 | 2/1993 | Evans et al. ...................... | 348/734 |
| 5,285,495 | 2/1994 | Wu et al. .......................... | 341/26 |
| 5,479,385 | 12/1995 | Hoekstra ........................... | 340/825.24 |
| 5,486,823 | 1/1996 | Tsai .................................. | 341/22 |

*Primary Examiner*—John K. Peng
*Assistant Examiner*—Jeffrey S. Murrell
*Attorney, Agent, or Firm*—Brian J. Wieghaus

[57] ABSTRACT

Apparatuses (1,2,3) of an audio/video system convey user commands to one another via a serial control bus (4). The user commands convey key activations on a remote handset (18a), whose keys include both "normal" keys such as "mute/unmute", and "repeat" keys such as "volume up" and "volume down". To convey a repeat key activation, a first control means (12) within one apparatus addresses a key activation message to a second control means (32) within another apparatus. The second control means (32) synthesises locally a repetitive series of user commands, until a key release message is received. The need for repetitive user command messages to be sent via the control bus is thereby eliminated, and the frequency of repetition can be defined locally to give consistent response to user commands. The second control means (32) can also implement a de-bouncing function, disregarding duplicate user command messages sent by a third apparatus (2) which also responds to the handset (18a).

6 Claims, 5 Drawing Sheets

APPARATUSES INTERCONNECTED FOR THE COMMUNICATION OF CONTROL MESSAGES

The present invention is a divisional of U.S. application Ser. No. 08/102,013 now U.S. Pat. No. 5,479,385 issued Aug. 4, 1993.

The invention relates to a system of at least first and second apparatuses interconnected for the communication of control messages by means of a serial data channel, the first apparatus having:

user input means defining a plurality of keys for activation by a user, and first control means responsive to the user commands, including means for identifying a user command which requires to be processed by a second control means located in the second apparatus of the system, and means for in such a case generating a control message conveying the received user command to said second apparatus via the serial data channel, the second apparatus including:

at least one functional element; and second control means for receiving via the serial data channel control messages conveying user commands received by the user input means of the first apparatus and for processing the conveyed user command to control the functional element(s) of the second apparatus in accordance with the user's wishes.

The invention further relates to apparatuses suitable for use in such a system.

A system as set forth above is described in EP 0 423 739 A2, where the apparatuses are domestic audio/video apparatuses and a shared control bus provides the serial data channel between two apparatuses. The keys are provided on a wireless remote control handset, to which more than one "first apparatus" may respond. This first reference describes means to prevent multiple actions occurring in response to a single activation of a key on the handset. Such action can conveniently be regarded as a form of de-bouncing.

An alternative means for de-bouncing in a similar system is described in European Patent application 92200856.0 not published at the priority date of the present application, whose contents are incorporated herein by reference. Again the serial data channel is provided by a shared bus, namely a Domestic Digital Bus (D2B). D2B has been standardised by the International Electrotechnical Commission, and provides for control of any connected apparatus by any other, being in other words a multi-master system with distributed control. "D2B" is a registered trade mark of Philips Electronics NV.

In this second reference it is described how a prolonged activation of the "volume-up" key on the remote control handset, implies a series of "volume up" commands, occurring repeatedly at a certain frequency until the key is released. Each repetition causes an increase of one step in the volume setting of the audio apparatus being controlled. In fact it is possible in the user input means of many known apparatuses to distinguish between this repeating type of key such as "volume up", "brightness down" etc., and a normal type of key, for which each activation implies just one user command, whatever its duration. Examples of "normal" keys are "1", "2", "play", "stop" and "standby".

A third reference is the European Home Systems Specification, Release 1.1, published by the European Home Systems Association, Eindhoven, NL. The specification provides for bus messages conveying key activations and, optionally, for a generic "key released" message.

In the systems described in the references, however, no distinction is made between user command messages conveying activation of "repeat" keys and those relating to "normal" keys. As described in the second reference, therefore, the prolonged activation of the "volume up" key results in repeated user command messages being generated on the shared bus, for example every 100 milliseconds. This rate of repetition is of course well within the capabilities of the D2B bus, but excess bus traffic should generally be avoided if possible. Moreover, if two or three apparatuses all respond to activation of a key on the same wireless remote control handset, the bus traffic is immediately multiplied two- or three-fold, irrespective of any de-bouncing mechanism. The resulting processing effort required of the control means of the second apparatus can also become a substantial overhead.

Yet further problems arise when it is desired to extend the principles of the user command techniques described in the references to provide inter-operation between apparatuses from different manufacturers (so-called "inter-brand compatibility"), or even between different models from the same manufacturers. The frequency of command repetition varies widely from manufacturer to manufacturer, from less than 5 per second in some present systems to perhaps 20 per second in future systems. At the same time, the number of discrete steps in, say, the volume adjustment of one television may be widely different to that of another television from the same or a different manufacturer. The number of steps can also be different for volume, brightness, contrast and other settings within one apparatus. Thus, the prior art techniques can lead to unpredictable performance in multi-brand systems.

It is an object of the invention to improve the quality of systems of the type set forth in the opening paragraph, by mitigating some or all of the above problems.

The invention provides a system of at least first and second apparatuses interconnected for the communication of control messages by means of a serial data channel, the first apparatus having:

user input means defining a plurality of keys for activation by a user, the defined keys including "normal" keys for which each activation implies a single user command and "repeat" keys for which a prolonged activation implies a repetitive series of user commands for the duration of the activation; and first control means responsive to the user commands, including means for identifying a user command which requires to be processed by a second control means located in the second apparatus of the system, and means for in such a case generating a control message conveying the received user command to said second apparatus via the serial data channel, the second apparatus including:

at least one functional element; and second control means for receiving via the serial data channel control messages conveying user commands received by the user input means of the first apparatus and for processing the conveyed user command to control the functional element(s) of the second apparatus in accordance with the user's wishes, wherein, to convey the prolonged activation of a repeat key the first control means operates to generate a first ("activation") control message conveying the user activation of the repeat key, followed by a second ("release") message in response to the user's eventual release of the repeat key, the second control means being responsive to the activation message for a repeat key to synthesise within the second apparatus the repetition of user commands in controlling the functional elements until receipt of the release message.

In a system according to the invention, each activation of a repeat key need give rise to at most two user command messages to be generated by the (or each) first apparatus, thereby eliminating a large amount of bus traffic and processor overhead. By arranging in advance that the second apparatus operates to distinguish user commands which relate to repeat keys from those which relate to normal keys, and by arranging that the second apparatus synthesises the repetition of the command locally for the duration of activation of a repeat key, the system retains the feature of repeating keys. Moreover, the frequency of repetition is determined solely within the second apparatus. Therefore the manufacturer can ensure a consistent operation in response to user commands whether they are received locally or via the data channel.

In one embodiment, a generic release message is defined for a group of repeat keys, there being a maximum of one repeat key activation conveyed for that group at any given time. The said group may comprise all of the repeat keys. Then only one extra message need be defined, which is understood by the second apparatus as applying to whatever repeat key is currently activated.

It may be that a message from the first apparatus conveying a new key activation is treated by the second control means as an implicit release message in respect of a repeat key for which an activation message, but not yet an explicit "release" message has been received from the same source. This allows a further reduction in the bus traffic in the event that the user switches quickly from one key activation to another.

In some embodiments, for example in automotive systems, the user input keys may be simple push buttons on a central control panel. On the other hand, in an embodiment where the keys for user activation are housed in a remote control element which communicates with the first control means via a further data channel, the remote control element may respond to the activation of a repeat key by transmitting a repetitive series of signals to the first control means, while, in the event that received user commands are to be conveyed to the second apparatus, the first control means recognises the repetitive series of signals as a prolonged activation of the repeat key, and addresses activation and release messages to the second apparatus accordingly. This allows use of a conventional remote control, which transmits each command repetitively to ensure reliable reception in spite of obstacles etc.

It may also be desirable for the first apparatus to transmit release messages for all keys, not just repeating keys. In-car applications, for example, very often assign two different meanings to long and short activities of a given key. It will be appreciated, then, that the first apparatus no longer needs to make any distinction between normal and repeating keys, provided that it does not send a repetitive series of activation messages in response to a single activation. The response to any key activation is determined entirely by the executing apparatus. If the duration of activation of a given key is not significant for its execution by the second apparatus, the relevant release message will simply be ignored.

To provide a de-bouncing function, the second apparatus may include means for determining when a message conveying user commands from a third apparatus originates from the same user key activation as a message received earlier from the first apparatus, and if so disregarding the later received message.

In a system including further apparatuses, it may be advantageous if a message from any source conveying a new key activation is treated by the second control means as an implicit release message in respect of a repeat key for which an activation message, but not yet a release message, has been received from the first apparatus, while an explicit release message received from a source other than the first apparatus is disregarded in respect of said repeat key.

As noted above, the invention is of particular benefit when the serial data channel comprises a shared bus. In one such embodiment, each apparatus is independently addressable as a device, the first control means being addressable as a control subdevice within the first apparatus.

The invention further provides apparatuses suitable for use in a system constructed in accordance with the invention, in particular for use as the first and/or second apparatuses of the system. These apparatuses are defined in the dependent claims.

Embodiments of the invention will now be described, by way of example, with reference to the accompanying drawings, in which.

Figure 1:
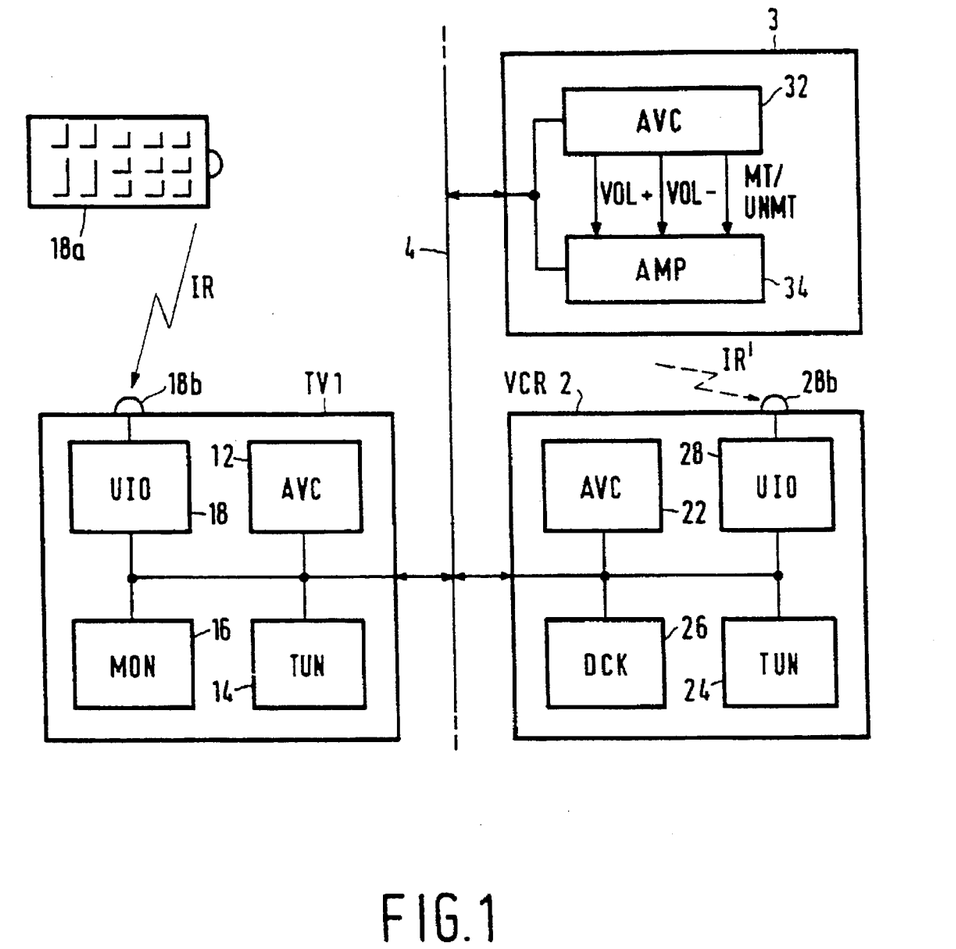
FIG. 1 shows in block form the logical structure of a home entertainment system embodying the invention.
Figures 2A, 2B:
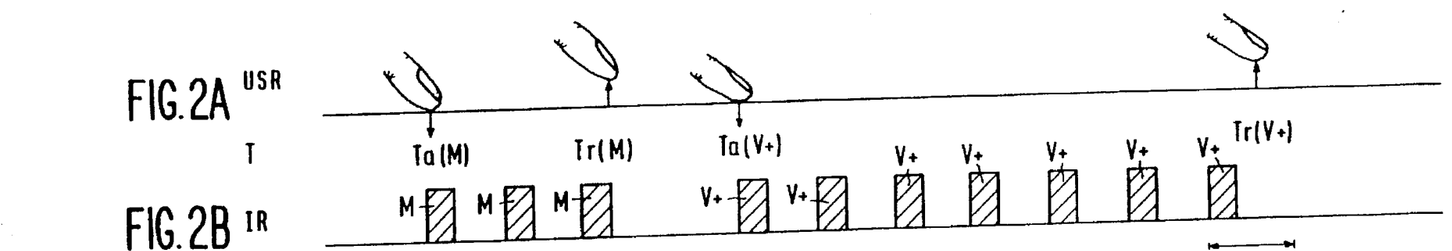
FIG. 2 illustrates the operation of the system of FIG. 1 in response to activation of normal and repeating type keys.
Figure 2C:
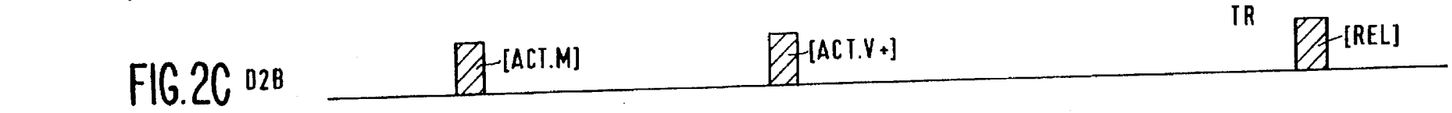
Figures 2D, 2E:
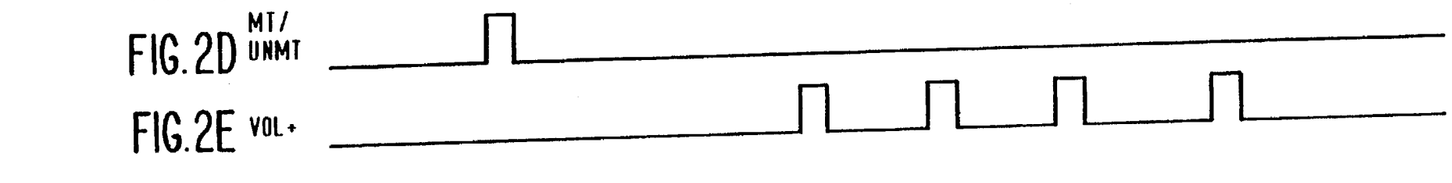
Figure 2F:
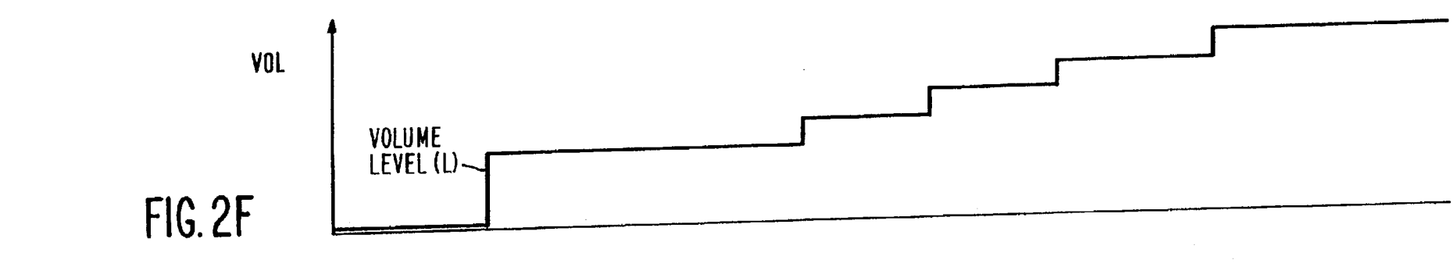

In the home entertainment system of FIG. 1, various apparatuses, 1, 2, 3, are connected to a standard serial bus 4. The apparatuses are, for the sake of example, a television receiver (TV) 1, a hi-fi audio amplifier 2 and a videocassette recorder (VCR) 3.

The serial data bus is in this embodiment a Domestic Digital Bus (D2B) as standardised by the International Electrotechnical Commission, Geneva. D2B provides for distributed control of the bus, and allows control messages to be uniquely addressed to specific "devices". Each apparatus 1, 2 and 3 in the system of FIG. 1 is addressable by its own device address, and functional elements within each device are independently addressable as "subdevices" of that device.

Within each of the apparatuses 1, 2 and 3 there are shown some blocks addressable as D2B subdevices. It should be appreciated that the division of a device into subdevices is necessary only in a logical sense, that is to say, from the point of view of its behaviour relative to the D2B bus 4 and the other apparatuses of the system. In the physical implementation of the device, there may or may not be corresponding separate physical modules. Typically, for example, the control logic of the AVC and the other subdevices within a device will be integrated in a single programmed microcontroller, which behaves logically as a number of separate subdevices addressable via the bus. The subdivides shown and described in the present embodiment are representative only.

In the embodiment shown, each device 1, 2 and 3 includes an audio/video controller (AVC) type of subdevice, 12, 22 and 32 respectively. These provide distributed control intelligence for the system, in particular for the interpretation of the user's commands and implementation of the user's wishes.

The television 1 includes, in addition to its AVC 12, a tuner subdevice 14, a video monitor subdevice 16 and a user input/output (User I/O) subdevice 18. The User I/O subdevice 18 incorporates user input means implemented in the form of a conventional infra-red remote control handset 18a, having keys for manual activation, and a matching infra-red receiver 18b.

Additional user input means may provide keys on a panel of the apparatus itself. All "keys" referred to herein may be mechanical buttons or other sensors. The keys may have fixed meanings, or be "soft" keys having different functions at different times.

The VCR device 2 includes, in addition to its AVC 22, a tuner subdevice 24, a tape deck subdevice 26 and a user I/O subdevice 28. The User I/O subdevice 28 is similar to that of the TV 1 and includes an infra-red receiver 28b, in addition to front panel keys of the VCR 2.

The audio amplifier 3 includes its AVC 32 and an amplifier subdevice 34. Within each apparatus, the subdevices can communicate without use of the bus, according to their physical implementation. In particular, in the audio amplifier apparatus 3, the AVC 32 can control the volume level of amplifier subdevice 34 by means of three logic signals: VOL+ (volume up), VOL- (volume down) and MT/UNMT (mute/unmute).

The apparatuses 1, 2 and 3 are of course also interconnected for the exchange of audio and video signals, by cables not shown in FIG. 1. These allow, for example, a VCR recording to be viewed on the screen (monitor subdevice 16) of the TV 1, and allow sound from TV broadcasts or recordings to be reproduced via the hi-fi amplifier 3. This latter application will be used as an example in the following description of the system operation in accordance with the invention.

The remote control handset 18i ahas keys for "volume up", "volume down" and "mute/unmute" operations, and others relating to programme selection, picture brightness, colour, etc., and perhaps teletext and VCR controls, too. Many of these keys represent user commands that can be executed locally in the TV 1, while others can only be executed by other apparatuses. In order to provide uniform operation of the system as a whole, it is desirable to provide protocols whereby user commands can be conveyed automatically by the apparatus which receives them to another apparatus which is capable of interpreting and executing them. This desire is addressed in the references mentioned in the introduction, in which control messages conveying user commands can be sent via a serial data channel to control means in another apparatus.

It is notable however that when a repeating type key such as "volume up" is activated for a prolonged period, the known systems involve the transmission of a repetitive series of bus messages, at a rate typical in the range from five to twenty repetitions per second. While the D2B system is capable of transmitting this quantity of data, and message loss does not result from an overload of data in the D2B system, it is desirable to minimise the bus traffic and processing overhead. For example, a User I/O sub-device may wish to receive several hundred bytes of data for an on-screen display, and it would be inconvenient if at the same time the user bus carrying a large number of repetitive user command messages.

To this end, a table of user command numbers is defined in the system of FIG. 1, or rather a number of tables may be defined, one for each class of apparatus. Table 1 shows a possible table of user command numbers for an audio amplifier function. Other tables can be defined for tuner functions, TV functions, VCR functions and so on. Each table can be identified by a table number, so that a control message sent via D2B can use table number and command number together to identify uniquely the key pressed. Each table may contain sub-tables and so on as required. Any D2B message will also identify its source by means of the unique device-subdevice address.

TABLE 1

| Command Number | Key Type | Meaning |
|---|---|---|
| 20 | normal | standby |
| 21 | normal | mute/unmute |
| 28 | normal | surround sound toggle (on/off) |
| 2C | normal | test signal (on/off) |
| 60 | release | repeat type key released |
| 68 | repeat | volume up |
| 69 | repeat | volume down |
| 6A | repeat | left level up/right level down |
| 6B | repeat | left level down/right level up |
| 6C | repeat | rear level up/front level down |
| 6D | repeat | rear level down/front level up |

In addition to identifying the meaning (key name) for each command number, Table 1 shows in the middle column that each command number has a type "normal", "repeat" or "release". This table of key names and types is known to the AVC subdevices of the system. The type of information can be used to reduce bus traffic in the system, as the example of FIG. 2 will now illustrate.

FIG. 2 illustrates the operation of the system of FIG. 1 when the user activates normal and repeat keys on the handset 18a, to increase the volume setting of the sound being reproduced by the system. At the top of the figure, the action of the user's finger against the key is represented at USR, with time T increasing towards the right. The transmission of infra-red signals from the handset 18a to receiver 18b on the TV 1 is represented at IR. The control messages sent via the bus 1 are represented along the line D2B. The muting signals within the amplifier 3 are represented at MT/UNMT, while the volume up signals are represented at VOL+. The actual volume level of the amplifier subdevice 34 is represented at VOLL.

The volume level VOLL of the amplifier is muted (at zero level) until time Ta(M), when the user activates the "mute" key on the handset. This causes the handset to transmit an infra-red mute signal M at regular intervals until the user releases the key at time Tr(M). This repetition of the infra-red signals is conventional and improves the chance of reception in the event that the infra-red beam is temporarily obstructed.

The infra-red signalling system includes a mechanism to distinguish a new activation of a key from the case where the beam from a single activation is temporarily obstructed. One known mechanism for this is to provide a control bit in the infra-red signal, which is constant during each key activation, but changes with each new activation. By this mechanism, the User I/O subdevice 18 recognises just one activation of the "mute" key, although three repetitions of the infra-red signal M are received. The User I/O subdevice 12 relays this key activation to the local AVC 12.

Having recognised the activation of the key at time Ta(M), the AVC 12, acting as first control means of the system, infers a single user command to mute/unmute the sound, and further determines that this command can only be executed within the audio amplifier 3. Accordingly, a key activation message [ACT.M] is composed and addressed to the AVC subdevice 32 of device AMP, which message conveys the user command. Within the amplifier 3 a mute/unmute signal MT/UNMT is generated, causing the volume level to rise to a previously set value.

After activating and releasing the "mute" key, the user then decides to increase the volume level, and activates the "volume up" key at time Ta(V+). The user holds the key for an extended period until time Tr(V+), when it is released. Again the handset transmits a repetitive series of signals, this time signals V+ identify the "volume up" key as the one pressed.

As before, the User I/O subdevice (first control means) infers from these repetitions a single prolonged activation of the key. However, the key is recognised as a repeat key (command number 68, Table 1), so that a repetitive series of volume up commands has to be inferred. The AVC 12 again determines that the user commands must be executed by the amplifier 3, and transmits a key activation message [ACT.V+] via the D2B bus to the AVC 32 amplifier, which then acts as the second control means referred to in the introduction.

In accordance with Table 1, the set of bus messages conveying user commands is predetermined, and known to the AVC subdevices of the system. Furthermore, the set of bus messages is divided into three subsets: activate (normal key); activate (repeat key); and release (repeating key). The AVC 32 therefore recognises the message [ACT.V+] as one of the second subset (activate repeat key). In response to this message [ACT.V+], the AVC 32 (second control means) begins to generate a series of signals on the line VOL+, each of which causes a step increase in the sound level VOLL produced by the amplifier subdevice 34.

At time Tr(V+) the user, having judged the sound to be loud enough, releases the volume up key on the remote handset 18a. This is detected by the User I/O subdevice when the next infra-red signal V+ fails to arrive, and communicated to the local AVC 12. A generic release message [REL] is sent via the bus to the AVC 32 of the audio amplifier 3. The AVC 32 responds to only one user command at any given time, and therefore recognises that the release message relates to the previous message [ACT.V+]. The AVC 32 stops generating VOL+ signals and the volume level VOLL remains at the user's desired level.

It will be apparent that significant bus traffic has been eliminated by the division of activation Messages into "normal" and "repeating" types, and the local generation of repetitive commands. There is also a saving in the amount of processing required in the AVC 32.

Moreover, the frequency of repetition of signals VOL+ is determined locally within the amplifier 3, not by the frequency of repitition of the IR signals V+. Therefore the volume setting will increase at a predictable rate, irrespective of differences between the manufacturers and models of the various apparatuses. Thus each manufacturer retains control of the behaviour of his product in response to a given user command, while allowing for a control mechanism distributed in a system of apparatuses from various manufacturers.

Figure 3:
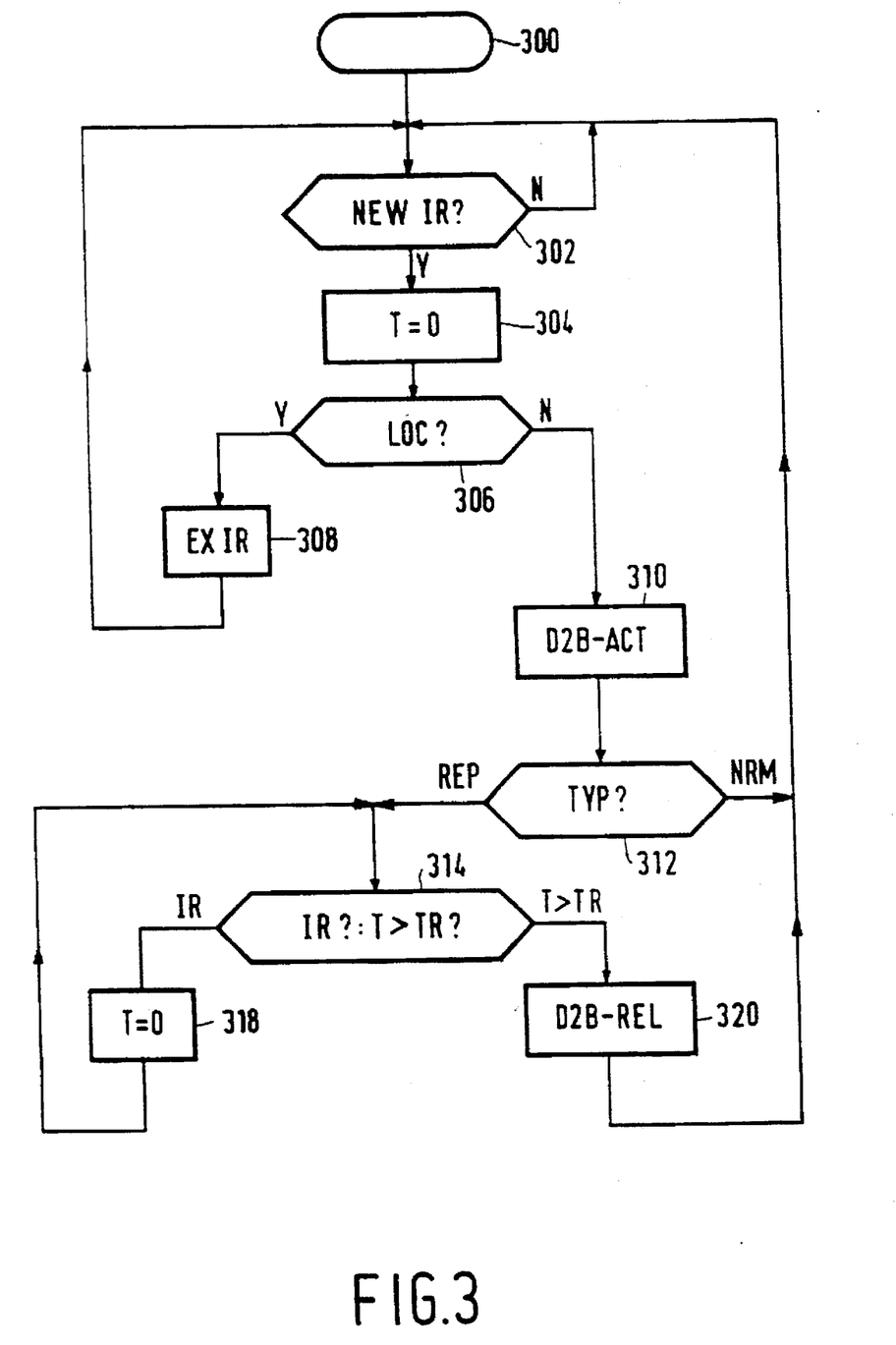
FIG. 3 illustrates the operation of a first control means within the system of FIG. 1.

FIG. 3 is a flowchart governing the operation of the AVC 12 in its role as first control means of the system of FIG. 1. Of course other activities will be occurring concurrently in the logical and physical implementation of TV receiver 1. Although a starting step is indicated at 300, the flowchart defines a control loop which exists for as long as the apparatus is active. The steps of this loop will now be described.

Step 302: AVC 12 waits to receive an infra-red signal IR which conveys a new key activation. Signals which are mere repetitions of a "normal" key activation previously recognised are identified and ignored in the conventional manner.

Step 304: When a new key activation has been detected, a time counter is reset to a reference value T=0. A repeating period TR is defined, slightly longer than the interval between repetitions of the IR signals when a key is activated for a prolonged period (see FIG. 2). The timer will generate a signal when period TR is exceeded (see Step 314).

Step 306: AVC 12 determines whether the new key activation is of relevance locally (within TV 1) or must be conveyed to another device.

Step 308: If locally relevant, the user command conveyed by the IR signal is executed within TV 1 and control returns to step 302.

Step 310: Having determined that the command is of relevance to another device (for example hi-fi amplifier 3), AVC 12 generates a D2B message conveying the user activation of that key to that other device ([ACT.M], [ACT.V+], etc. FIG. 2).

Step 312: If the activated key is a normal key, control returns to step 302.

Step 314: If the activated key was a repeat key, the control means waits for either a new repetition of the IR signal or for expiry of the repetition period TR, whichever happens first.

Step 318: If a new repetition of the IR signal is received before the time count T reaches TR, the timer is reset to T=0, and control returns to step 314.

Step 320: If the period TR is exceeded (314) and no release of the key can be presumed repetition of the IR signal has been received, a D2B release message ([REL], FIG. 2) is addressed to the other device, conveying the release of the key. Control returns to step 302.

Figure 4:
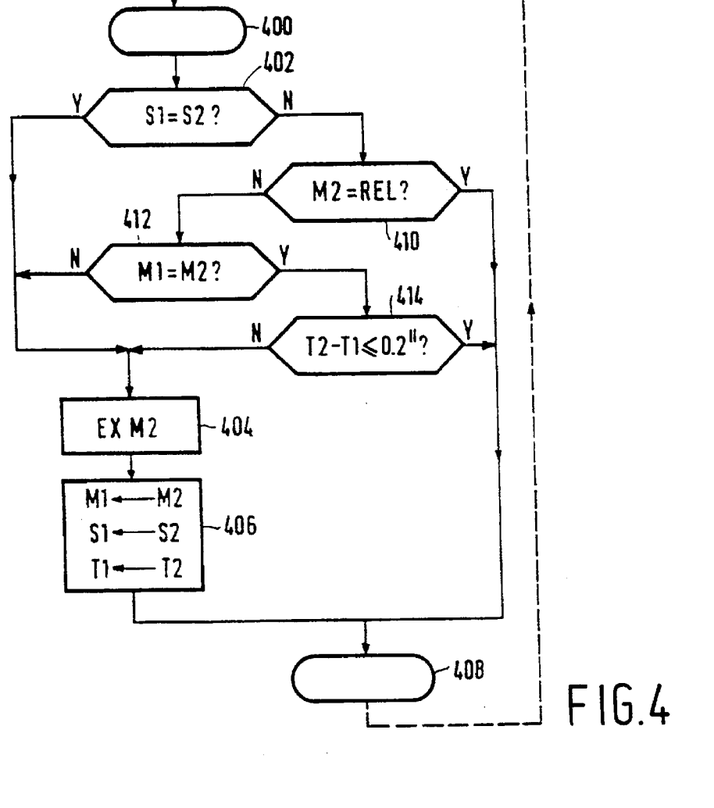
FIGS. 4 and 5 are flowcharts illustrating the operation of a second control means in the system of FIG. 1.

FIG. 4 is a flowchart governing operation of the second control means, within the apparatus (for example amplifier 3) which receives user command messages via the D2B bus in the system of FIG. 1.

The flowchart not only provides appropriate response to normal and repeat key activation messages, but also incorporates a "de-bouncing" function of the type described in the second reference. The de-bouncing function allows for the presence of more than one infra-red receiver that may receive the IR signals from handset 18a. In the system of FIG. 1, for example, VCR 2 in particular also has an infra-red receiver 28b, which forms a user input means for the User I/O subdevice 28 of VCR 2. This User I/O subdevice 28 can also receive signals IR' shown dotted, identical to the signals IR received by infra-red receiver 18b of TV 1. Now, the AVC 22 of the VCR 2 is also equipped to act as a first control device in accordance with FIG. 3, and will respond to the same key activations in the same manner as the AVC 12 of the TV 1.

Clearly AVC 32 can expect to receive key activation messages from two or more AVCs, even though they originate from a single key activation, but fortunately each D2B message includes a device-subdevice address identifying the source of the message. Therefore, having received one key activation message, the AVC 32 is able to disregard any subsequent activation message which: (i) originates from a different source subdevice; (ii) conveys an identical user command; and (iii) is received within a de-bouncing period of, say, 0.2 seconds.

Such a mechanism, adapted to cope also with the activation of repeat keys and with key release messages, is embodied in the following steps of FIG. 4.

Step 400: A user command message has previously been received and executed. The source address S1 and command number M1 have been stored, and also the time T1 at which the message was received.

Step 402: A new message is received at time T2 with source identifier S2 and command number M2. Source address S2 is compared with stored source address S1.

Step 404: If sources S1 and S2 are the same the user command message relates to a new key activation and the command is executed.

Step 406: After execution of a user command received via D2B, the data M2, S2 and T2 are stored in place of the old data M1, S1 and T1.

Step 408: The procedure ends, wait for a new command.

Step 410: If the sources S2 and S1 are found in step 402 to be different, the command number M2 is checked to see if the message is a key release message. If so, control passes straight to Step 408. A generic release message [REL] from a different source is not permitted to terminate the activation of a repeat key (for example [ACT.V+]).

Step 412: If the message is not a release message (410,N), M2 is compared with M1 to see if the new message conveys the same command as the old message. If not, it should be executed, and control passes to step 404.

Step 414: If M1 and M2 are the same (412,Y), then times T1 and T2 are compared to determine whether the new message arrived within the de-bouncing period of the old message (T2 less than 0.2 seconds after T1). If so, it can be disregarded as a duplicate and control passes to step 408. If the de-bouncing period has expired (414,N), the message is deemed to convey a new user command and is executed in step 404.

With regard to key activation messages, the flowchart of FIG. 4 is logically equivalent to the flowchart of FIG. 3 in the second reference.

Figure 5:
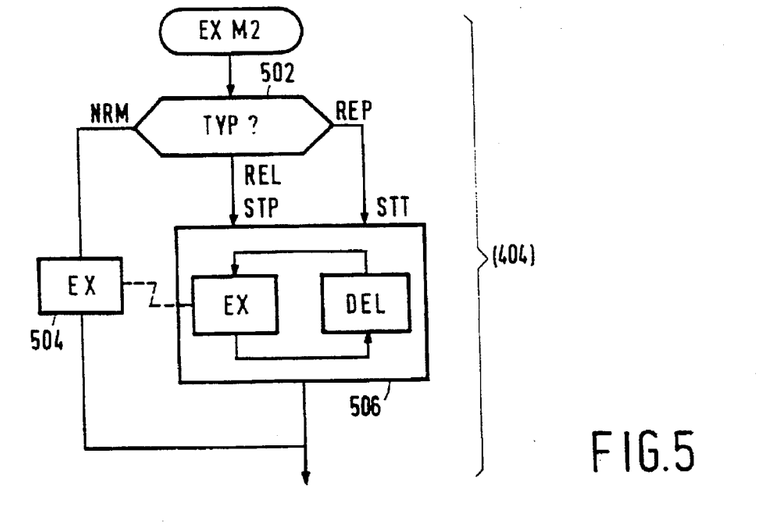
Figure 6A:
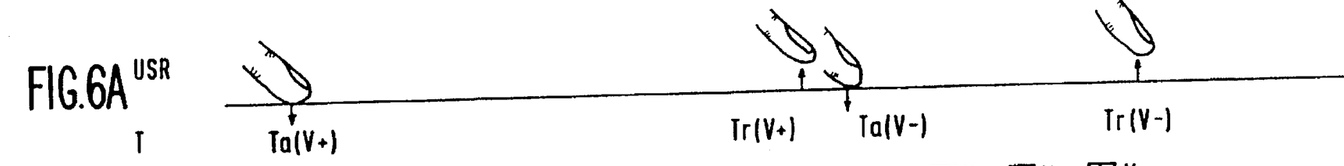
FIG. 6 illustrates the operation of the system in the event of activation of two repeat keys in rapid succession.
Figure 6B:
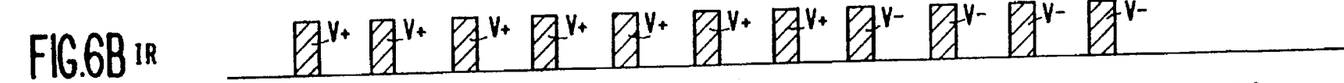
Figures 6C, 6D, 6E:
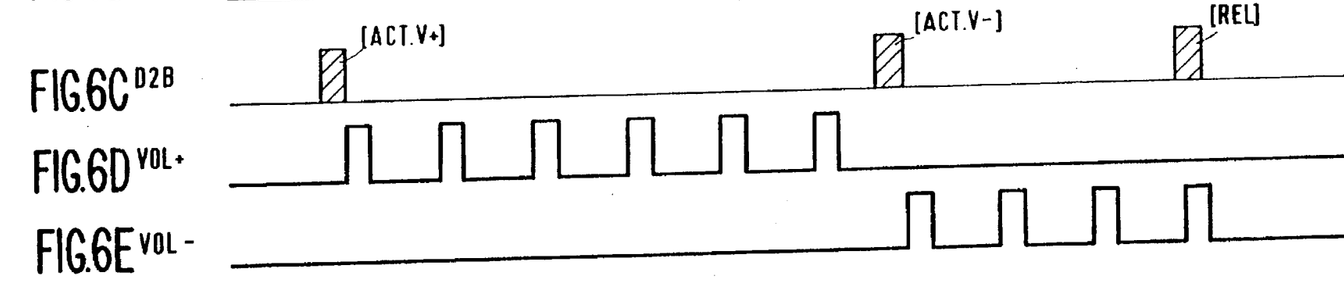
Figure 6F:
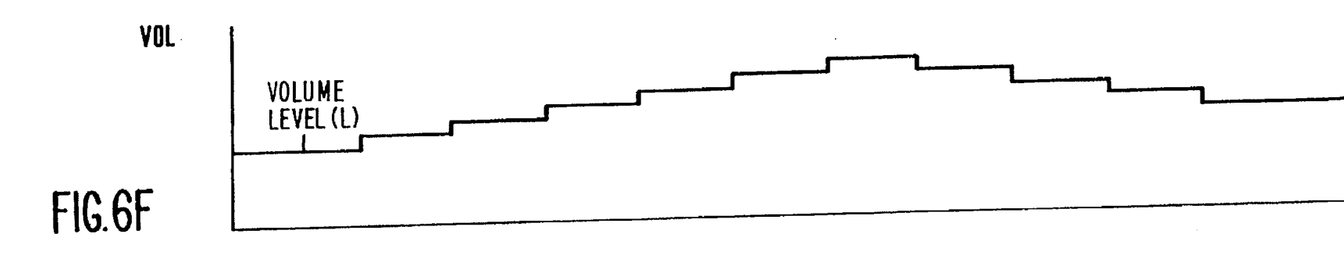

FIG. 5 shows in more detail the execution step 404 of the flowchart of FIG. 4.

Step 502: Command number M2 of the user command message to be executed is examined to distinguish between a normal key activation message (NRM), a repeat key activation message (REP) and a key release message (REL).

Step 504: A normal key activation corresponds to a single user command which is executed once (for example "mute/unmute"). Control then leaves step 404.

Step 506: A repeat key activation message initiates (STT) a repetitive cycle of executing the command (for example "volume up"), with a small delay between each execution. A release key message breaks this cycle (STP) and control leaves step 404.

Since a rule has been established whereby only one user command can be executed at a time, execution of a new command will implicitly break the cycle of executing a repeat key command. This is indicated by the dotted connection from step 504 to step 506 in FIG. 5.

FIG. 6 shows the use of this feature when the user activates the "volume up" key for a period Ta(V+) Tr(V+), followed closely by activation of the "volume down" key for a period Ta(V−) to Tr(V−). The elements of FIG. 6 correspond closely to those of FIG. 2. However, upon release of the "volume up" key at time Tr(V+), AVC 12 has not yet sent a release message [REL] when it detects activation of the "volume down" key (IR signals "V−"). Since only one user command can be executed at a time by AVC 32, the AVC 12 can decide to save time and bus traffic by sending the new activation message [ACT.V−] without sending an explicit release message [REL]. When the "volume down" key is then released at time Tr(V−), an explicit release message [REL] is addressed to the AVC 32.

It may be noted that, while a release message [REL] is disregarded if it does not come from the same source as the respective repeat key activation message (step 410, Y), the repeat key activation can be implicitly released by a new key activation conveyed from any source (step 410, N). Thus, for example, while the message [ACT.V+] in FIG. 6 may originate from the TV 1, the message [ACT.V−] which implicitly releases the volume up command could come not from the TV 1 but from the VCR 2. This is advantageous in the event that the TV 1 should suddenly become unable to transmit the release message: the user can halt the volume increase by issuing any new command via another apparatus such as the VCR 2.

As noted in the introduction above the distinction between normal and repeat keys is material chiefly for the operation of the second apparatus. The first apparatus may send release messages for repeat keys only, or for all keys. Release messages for normal keys will simply be disregarded by a second apparatus constructed to operate as described above.

From reading the present disclosure, other variations will be apparent to persons skilled in the art. Such variations may involve other features which are already known in the design, manufacture and use of local communication systems, home entertainment systems and component parts thereof and which may be used instead of or in addition to features already described wherein. Although claims have been formulated in this application to particular combinations of features, it should be understood that the scope of the disclosure or the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A first apparatus for use in a system for communicating control messages between said first apparatus and a second apparatus by means of a serial channel, said first apparatus comprising:

user input means defining a plurality of keys including normal keys for which each activation implies a single user command and repeat keys for which a prolonged activation implies a repetitive series of user commands for the duration of the activation; and first control means responsive to the user commands for identifying a user command to be processed in said second apparatus, said first control means including means for generating a control message to convey said user command to said second apparatus;

wherein to convey the prolonged activation of a repeat key the first control means generates a first ("activation") control message conveying the user activation of the repeat key, followed by a second ("release") message in response to the user's eventual release of the repeat key, the second apparatus being responsive to the activation message for a repeat key to synthesize within the second apparatus the repetition of user commands in controlling the second apparatus until receipt of the release message.

2. An apparatus having an interface for the communication of control messages to a further apparatus by means of a serial data channel, the apparatus comprising:

user input means defining a plurality of keys for activation by a user, the defined keys including "normal" keys for which a single user command is inferred from each activation of any duration, and "repeat" keys for which a repetitive series of user commands is inferred from a prolonged user activation of the key until user release of the key; and control means, responsive to the inferred user commands, including means for identifying a user command which requires to be processed within the further apparatus connected to the serial data channel and means for, in a first mode, generating a control message conveying the inferred user command to the further apparatus via the serial data channel, wherein, to convey the prolonged activation of a repeat key, a first ("activation") message is generated in response to the activation of the key, followed by a second ("release") message in response to the user's eventual release of the key, and wherein the control means operates to generate a message conveying a new activation of a key when the activation message, but not yet the release message has been generated for one of the repeat keys whereby the new activation message in a second mode forms an implicit release message.

3. The apparatus of claim 2, further including a generic message being defined for a group of repeat keys and there being a maximum of one repeat key activation for said group at any predetermined time.

4. An apparatus having an interface for communicating with another apparatus via a serial data channel, said apparatus comprising at least one functional element and control means for receiving control messages from said another apparatus whereby a subset of said messages conveying user activation of a key defined by said another apparatus, the control means operating to process messages of said subset to a control operation of the functional element in accordance with a user's wishes inferred therefrom; the subset of control messages conveying key activations are subdivided into "normal" and "repeat" key activation messages and in that from the normal key activation message the control means infers a single function control operation, while from the repeat key activation message the control means infers a repetitive series of function control operation until a release key message is received via the data channel, and from a generic release key message the control means infers the release of any repeat key for which an activation message has been received from the same source.

5. The apparatus as claimed in claim 4, wherein the control means infers from a new key activation message received from any source the release of any repeat key for which an activation message, other than a release message, has been received.

6. The apparatus as claimed in claim 4, wherein the control means includes means for determining when a message conveying a user command from one apparatus originates from the same user key activation as a message received earlier from another apparatus, and if so disregarding the later received message.

\* \* \* \* \*